United States Patent
Jakob et al.

(10) Patent No.: US 6,732,655 B1
(45) Date of Patent: May 11, 2004

(54) IGNITION DEVICE FOR RESTRAINT MEANS IN A VEHICLE

(75) Inventors: Gert Jakob, Stuttgart (DE); Werner Nitschke, Ditzingen (DE); Ralf Hauser, Ditzingen (DE); Martin Zywietz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,676

(22) PCT Filed: Jun. 29, 1999

(86) PCT No.: PCT/DE98/01885

§ 371 (c)(1),
(2), (4) Date: Jun. 7, 2001

(87) PCT Pub. No.: WO00/34084

PCT Pub. Date: Jun. 15, 2000

(30) Foreign Application Priority Data

Dec. 7, 1998 (DE) .......................... 198 56 325

(51) Int. Cl.⁷ .............................................. F42C 19/12
(52) U.S. Cl. ................... 102/202.1; 102/202.2; 102/202.8
(58) Field of Search .......................... 102/202.5, 202.8, 102/215, 202.1, 202.2

(56) References Cited

U.S. PATENT DOCUMENTS 5,054,395 A * 10/1991 Vetter et al. ............. 102/202.2
5,140,906 A * 8/1992 Little, II ................. 102/202.14
5,230,287 A * 7/1993 Arrell et al. ............. 102/202.5
5,345,872 A * 9/1994 Takahashi et al. ...... 102/202.14
5,431,101 A * 7/1995 Arrell et al. ............ 102/202.14
5,596,163 A * 1/1997 Caflisch et al. ........ 102/202.14
5,639,986 A * 6/1997 Evans ..................... 102/202.1
5,798,476 A * 8/1998 Bailey .................... 102/202.14
5,889,228 A * 3/1999 Ewick et al. ............ 102/202.5
5,969,286 A * 10/1999 Ward et al. ............. 102/202.14
6,085,659 A * 7/2000 Beukes et al. .............. 102/200

FOREIGN PATENT DOCUMENTS

| DE | 196 09 908 | 9/1997 |
| DE | 196 10 799 | 9/1997 |
| DE | 19962590 | * 12/1999 |
| EP | 0 802 092 | 10/1997 |

* cited by examiner

Primary Examiner—Michael J. Carone
Assistant Examiner—Troy Chambers
(74) Attorney, Agent, or Firm—Kenyon & Kenyon

(57) ABSTRACT

A firing device, in which electrostatic chargings do not lead to an unintentional triggering of the firing element, is composed of a module housing in which a firing element and a circuit means arrangement are arranged, and which has terminal posts that, on the one side, are contacted to the circuit arrangement, and on the other side, are brought out from the module housing for the connection to a plug connector. The firing device includes at least one conductive member that is contacted to the firing capsule and that has a defined distance to the individual terminal posts, such that, in response to an electrical charging, a voltage sparkover occurs between the terminal posts and the conductive member.

5 Claims, 4 Drawing Sheets

IGNITION DEVICE FOR RESTRAINT MEANS IN A VEHICLE

FIELD OF THE INVENTION

The present invention relates to a firing device for restraint means in a vehicle, at least one firing element, surrounded by a conductive capsule, and circuit means—preferably for the energy supply, for triggering and/or diagnosis of the firing element—being accommodated in a common module housing, and the module housing being provided with terminal posts which, one the one side, are contacted to the circuit means, and on the other side, are brought out from the module housing for connection to a plug connector.

BACKGROUND INFORMATION

A firing device is described in German Patent No. 196 10 799. This known firing device is conceived such that it has the smallest possible outer dimensions compared to firing devices used till now, so that, for example, it can even be accommodated in the steering wheel of a vehicle. Namely, heretofore the firing element and an ignition power module, which contained circuitry for energy supply, for triggering and/or diagnosis of the firing element, were accommodated in separate modules contactable to each other via connectors. According to German Patent No. 196 10 799, besides a firing element generating the thermal energy for igniting an ignition mixture, also arranged in a module housing are circuit elements, for instance, for the energy supply, the triggering and/or diagnosis of the firing element. Located in the module housing, below the firing element, is a rectangular-shaped member in which contact pins for the firing element are integrated, and on whose sidewalls circuit elements are applied. The rectangular-shaped member is used both for fixing contact pins for the firing element in place, as well as for positioning terminal posts which are brought out from the module housing for contacting to a plug connector.

When handling the firing device prior to or during installation in a motor vehicle, an electrostatic charging can occur within the module housing, which means a disruptive discharge voltage can develop that is sufficient to trigger the firing element. In the same way, electrostatic chargings in the firing device are possible when it is already installed in a vehicle. Therefore, an object of the present invention is to provide a firing device which prevents an unintentional triggering of the firing element as a result of electrostatic charging.

SUMMARY OF THE INVENTION

According to the present invention, present in the module housing is at least one conductive member, contacted to the firing capsule, which has a defined distance to the individual terminal posts, such that in response to an electrostatic charging, a voltage sparkover occurs between the terminal posts and the conductive member. The terminal posts, together with the conductive member, form a spark gap over the defined distance, via which a discharge occurs when the charge exceeds a certain value. The charge is thereby prevented from discharging directly to the firing element, and there causing an unintentional triggering.

Accordingly, the conductive member is mounted on a base that fixes the terminal posts in position. The conductive member can be contacted to the firing capsule either by the conductive member having a cut-out for mounting the firing capsule, or by providing the firing capsule with a sleeve which is able to be placed over the conductive member. In this context, the conductive member can be a metal ring that rests on the substrate and has a collar forming an angle, over which the sleeve of the firing capsule can be placed.

Circuit means can be arranged on a substrate, a spring element resting on the substrate producing an electrical connection between the circuit means on the substrate and contact pins of the firing element.

DETAILED DESCRIPTION

Figure 1:
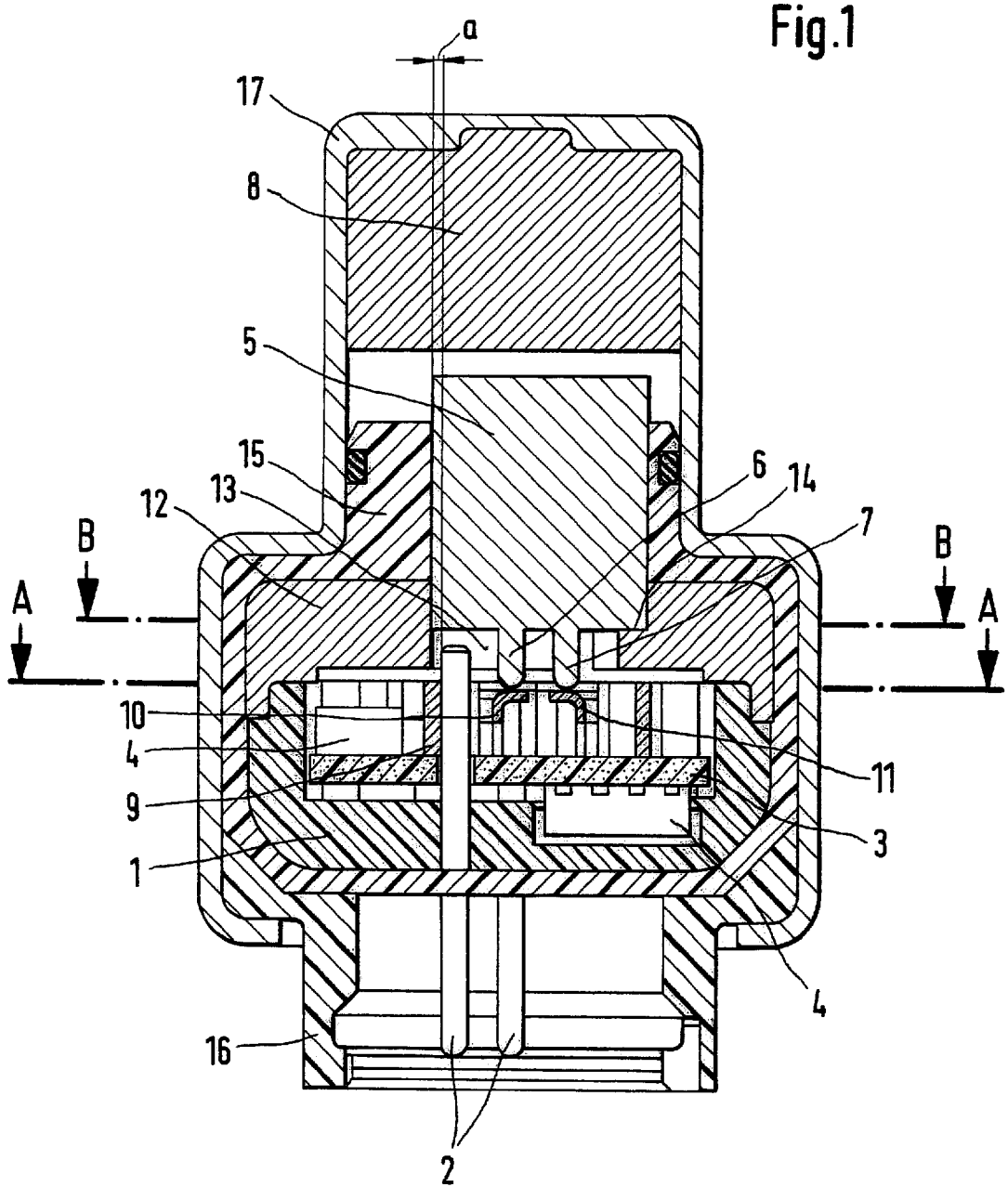
FIG. 1 shows a longitudinal section through a firing device of a first type.

The firing device shown as a longitudinal section in FIG. 1 is constructed as follows: Situated in the lower part is a base 1 in which a plurality of terminal posts 2 are fixed in position. Base 1 is made either of a plastic or a metal. In a metal base 1, terminal posts 2 must be fixed in position in an insulated manner, for example, by a glass melt. Terminal posts 2 extend on one side into the interior of the module housing of the firing device, and on the other side, project out of the module housing for the connection, for example, to a bus connector. Triggering signals, for instance, or other data are transmitted via terminal posts 2 to the firing device from a central control unit connected to a bus line.

Base 1 is used as a mounting support for a substrate 3, on whose upper and/or lower side a plurality of circuit elements 4 are arranged. These circuit elements 4 are, for example, SMD-components or ASIC's in flip-chip technology. Circuit elements 4 are preferably energy-supply circuits or circuits for triggering and/or diagnosing a firing element located in the module housing, it being possible to see capsule 5 surrounding the firing element and contact pins 6 and 7 brought out from it in FIG. 1. The firing element itself shall not be further described here, since it can be designed according to the related art (e.g. German Patent No. 196 10 799). In the simplest case, it is a resistance wire to which a current can be supplied via contact pins 6 and 7. Located within firing capsule 5 is a firing charge which is fired in response to current flow via contact pins 6 and 7. In the exemplary embodiment shown, a further encapsulated firing charge 8 is disposed above firing capsule 5. This further firing charge 8 is necessary when, for example, the firing device is intended to be used in a seat-belt tightener. Otherwise, however, the one firing charge provided in firing capsule 5 also suffices.

Figure 1A:
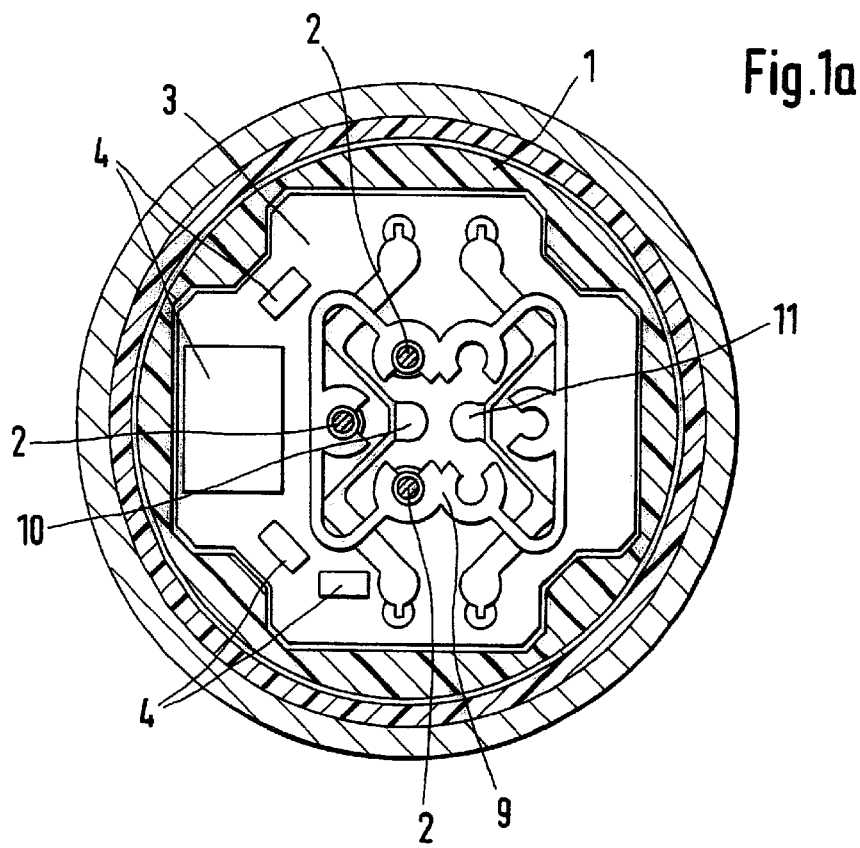
FIG. 1a shows a cross-section A—A through the firing device.

An electrical connection between contact pins 6 and 7 of firing element 5, and circuit elements 4 on substrate 3 is effected via a spring element 9 that rests on substrate 3, is contacted there to printed circuit traces and has elastic contact tabs 10 and 11 which touch contact pins 6 and 7 of firing element 5. A cross-section A—A, shown in FIG. 1a, clarifies the embodiment of spring element 9. Spring element 9 is made of an insulating plastic framework which, in a clamp-like manner, embraces terminal posts 2 that protrude through substrate 3 and are contacted to printed circuit traces on substrate 3, and in this manner is retained in a fixed position. Contact tabs 10 and 11 are hung in the plastic framework of spring element 9, the contact tabs having such a distance with respect to terminal posts 2 that a voltage sparkover cannot occur between terminal posts 2 and contact tabs 10 and 11 in the event of an electrostatic charging of the firing device.

Figure 1B:
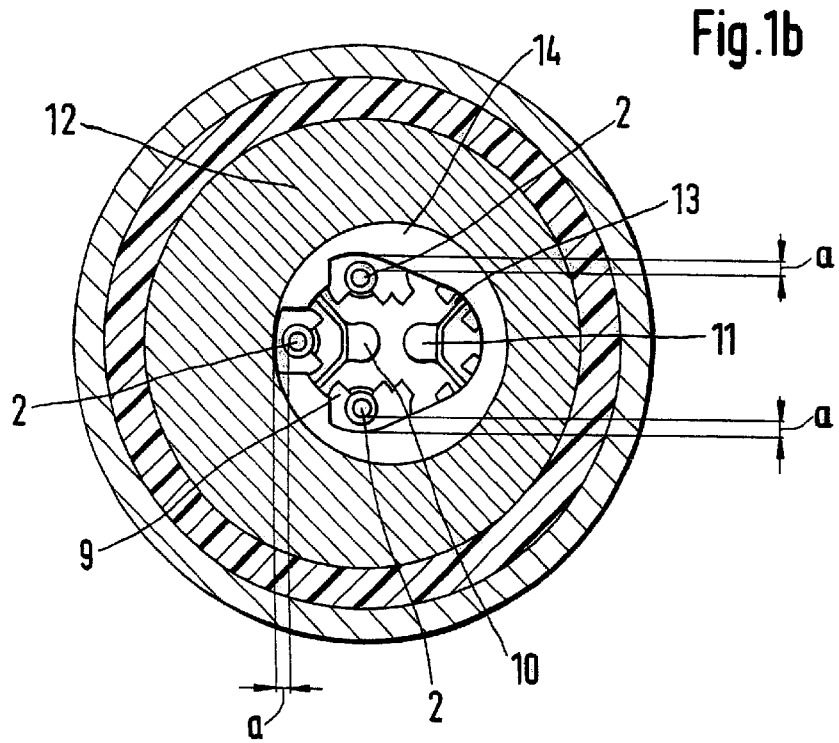
FIG. 1b shows a cross-section B—B through the firing device.

As FIG. 1 shows, a conductive member 12 is disposed on the edge of base 1 in the interior of the module housing. This conductive member 12 is used as retainer for firing capsule 5. Conductive member 12 is electroconductively contacted to firing capsule 5 and has an opening 13 through which contact pins 6 and 7 of firing element 5 extend to contact tabs 10 and 11 of spring element 9. Cross-section B—B, shown in FIG. 1b, shows clearly that, extending around opening 13, through which spring element 9 is visible in FIG. 1b, is an edge 14 of conductive member 12, upon which firing capsule 5 rests. Firing capsule 5 can be fixed in position in conductive member 12 by soldering, welding, cementing or press-fitting.

FIG. 1 shows that firing capsule 5, conductive member 12 and base 1 are enclosed by a plastic extrusion coat 15. Finally, located below base 1 is also a (socket 16. A casing 17 (made, for example, of aluminum) encloses socket 16, plastic extrusion coat 15 and further firing charge 8, resulting overall therefore in a closed module housing.

When installing the firing device in a vehicle, an electrostatic charging of the firing device can occur, because of which, currents of such magnitude may flow via contact pins 6 and 7 through the firing element that an unwanted firing comes about. To rule out such unintentional firings, means are provided in the firing device which prevent electrostatic charges from discharging via contact pins 6 and 7 through the firing element and possibly triggering it. These means include conductive member 12, with respect to which terminal posts 2, via which electrostatic charges can flow from the outside into the firing device, have a defined distance a (see FIGS. 1, 1b). Terminal posts 2, which extend into opening 13 of conductive member 12 and, in so doing, maintain distance a with respect to conductive member 12, form, together with conductive member 12, a spark gap via which an electrostatic charge can be reduced through a voltage sparkover, without at the same time a current flowing via firing element 5. Distance a between terminal posts 2 and conductive member 12 is to be especially selected in such a way that, in response to voltages which could lead to an unintentional firing, a sparkover occurs. Thus, electrically conductive member 12 has not only the function of a mounting support for firing element 5, but is also used as a charge bleeder to protect firing element 5 from unintentional firings.

Figure 2:
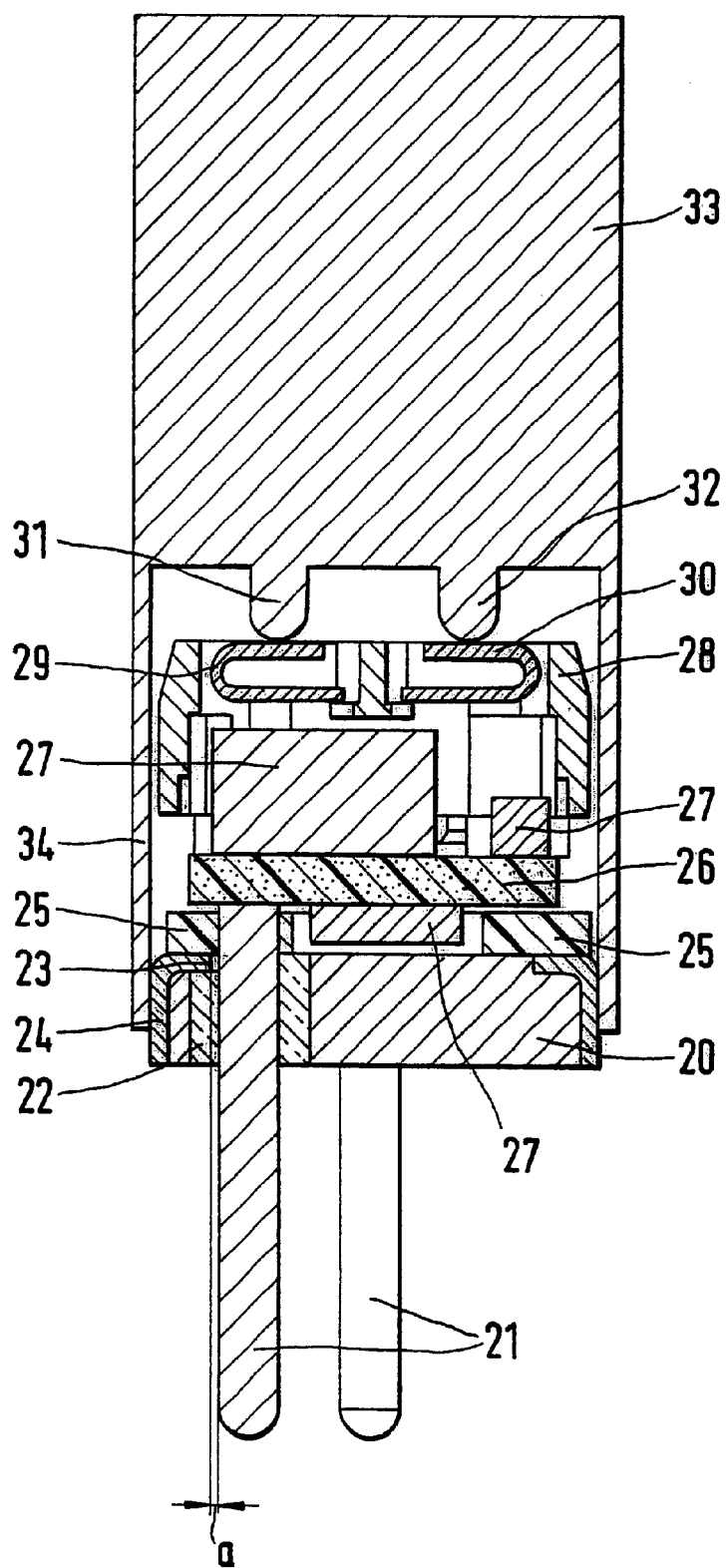
FIG. 2 shows a longitudinal section through a firing device of a second type.

FIG. 2 shows a second specific embodiment of a firing device. It again has a base 20 in which terminal posts 21 are fixed in position. In this case, base 20 is a metal base in which terminal posts 21 are fixed in bore holes in an insulating manner by a glass melt 22. Resting on base 20 is a metal ring 23 which has a collar 24 forming an angle downward over the edge of base 20. An insulating body 25 is inserted between metal base 20 and a substrate 26 which is fixed in position with terminal posts 21 by soldering or cementing. The upper and lower sides of substrate 26 are equipped with circuit elements 27. A spring element 28 mounted on substrate 26 is contacted on the one hand to printed circuit traces on substrate 26, and on the other hand, has contact tabs 29 and 30 which produce an electrical connection between circuit elements 27 on substrate 26 and contact pins 31 and 32 of a firing element. As already described in connection with FIG. 1, the firing element is accommodated, together with a firing charge, in a capsule 33. Firing capsule 33 is provided with a sleeve 34, projecting beyond contact pins 31 and 33, which can be placed over angled collar 24 of metal ring 23. Sleeve 34 of firing capsule 33 is fixed in position on collar 24 of metal ring 23 by soldering, welding or cementing. Due to sleeve 34 of firing capsule 33, the necessary space is obtained for mounting circuit elements 27, and at the same time, firing capsule 33 forms the outer casing of the entire firing device.

Like conductive member 12 in the exemplary embodiment of FIG. 1, metal ring 23 is used here as a mounting support for firing capsule 33, and at the same time for the discharge of electrostatic charge. Terminal posts 21 are led past metal ring 23 at a distance a, so that a spark gap is formed between terminal posts 21 and metal ring 23.

Figure 3:
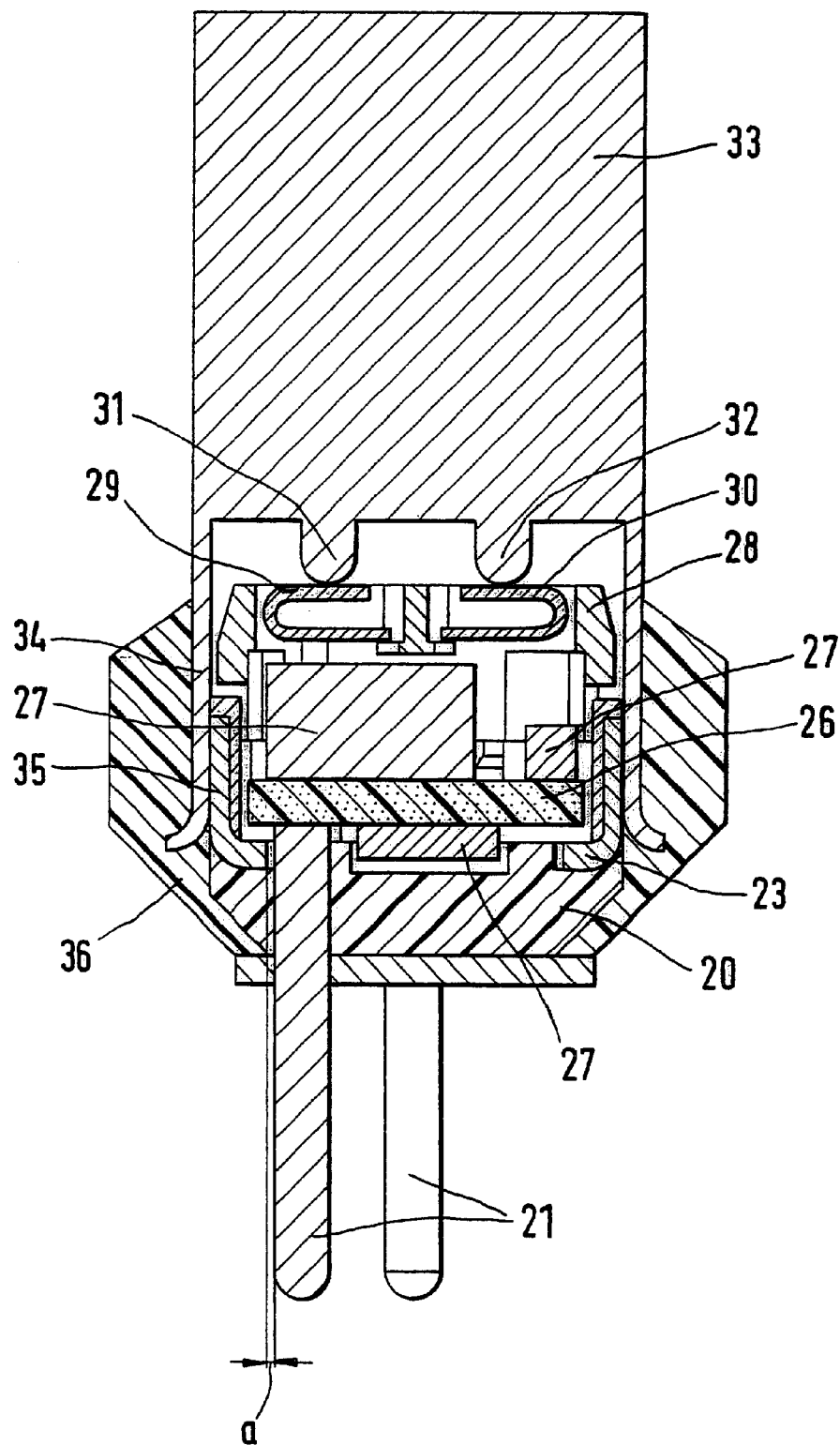
FIG. 3 shows a longitudinal section through a firing device of a third type.

The exemplary embodiment of a firing device shown in FIG. 3 differs from that in FIG. 2 merely in that base 20 is made of an insulating plastic, which is why it is possible to dispense with insulating medium between base 20 and substrate 26. In addition, metal ring 23 has a collar 35 forming an angle upward, over which sleeve 34 of firing element 33 is placed. Otherwise, this metal ring 23 has the same function as a spark gap, as has already been described in the exemplary embodiment of FIG. 2. A plastic extrusion coat 36 encloses sleeve 34 of firing capsule 33 with base 20.

What is claimed is:

1. A firing device for a restraint device in a vehicle, comprising:

a conductive firing capsule including contact pins;

a substrate;

a circuit arrangement situated on the substrate;

a common module housing accommodating the circuit arrangement, the module housing including terminal posts, the terminal posts having a first side contacting the circuit arrangement and having a second side extending from the module housing;

at least one conductive member contacting the firing capsule, the at least one conductive member having a defined distance to the terminal posts such that, in response to an electrostatic charging, a voltage sparkover occurs between the terminal posts and the at least one conductive member; and at least one contact tab coupled to a spring element situated on the substrate, wherein the at least one contact tab produces an electrical connection between the circuit arrangement and the contact pins.

2. The firing device according to claim 1, wherein the circuit arrangement performs at least one of the following: supplies energy, triggers the firing capsule, and diagnoses the firing capsule.

3. The firing device according to claim 1, further comprising a base for fixing the terminal posts in position, the at least one conductive member being mounted on the base, the at least one conductive member having a cut-out for mounting the firing capsule.

4. The firing device according to claim 1, further comprising a base for the terminal posts in position the at least one conductive member being mounted on the base, the firing capsule having a sleeve capable of being placed over the at least one conductive member.

5. The firing device according to claim 4, wherein the at least one conductive member includes a metal ring situated on the base, the metal ring having a collar forming an angle, the sleeve of the firing capsule being capable of being placed over the collar.

* * * * *